(12) United States Patent
Girt et al.

(10) Patent No.: US 6,777,112 B1
(45) Date of Patent: Aug. 17, 2004

(54) STABILIZED RECORDING MEDIA INCLUDING COUPLED DISCONTINUOUS AND CONTINUOUS MAGNETIC LAYERS

(75) Inventors: Erol Girt, Berkeley, CA (US); Hans Jürgen Richter, Palo Alto, CA (US); Samuel D. Harkness, San Francisco, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 137 days.

(21) Appl. No.: 09/971,693

(22) Filed: Oct. 9, 2001

Related U.S. Application Data

(60) Provisional application No. 60/239,304, filed on Oct. 10, 2000, and provisional application No. 60/239,477, filed on Oct. 10, 2000.

(51) Int. Cl.[7] .............................. G17B 5/66; G11B 5/70
(52) U.S. Cl. ..................... 428/694 TM; 428/694 TS; 428/336; 428/212; 428/900
(58) Field of Search ................... 428/694 TM, 694 TS, 428/336, 212, 900

(56) References Cited

U.S. PATENT DOCUMENTS

| | | | |
|---|---|---|---|
| 3,337,075 A | 8/1967 | Stein | 117/215 |
| 4,992,338 A | 2/1991 | Hatwar et al. | 428/694 |
| 5,227,212 A | 7/1993 | Ahlert et al. | 360/97.01 |
| 5,408,377 A | 4/1995 | Gurney et al. | 360/113 |
| 5,702,830 A | 12/1997 | Miller et al. | 428/611 |
| 5,725,963 A | 3/1998 | Iwasaki et al. | 428/611 |
| 5,795,663 A | 8/1998 | Koike et al. | 428/692 |
| 5,834,085 A | 11/1998 | Lairson et al. | 428/65.3 |
| 5,834,111 A | 11/1998 | Lal et al. | 428/332 |
| 5,991,125 A | 11/1999 | Iwasaki et al. | 360/113 |
| 6,031,692 A | 2/2000 | Kawawake et al. | 360/113 |
| 6,077,586 A | 6/2000 | Bian et al. | 428/611 |
| 6,280,813 B1 * | 8/2001 | Carey et al. | 428/65.3 |
| 6,420,058 B1 * | 7/2002 | Haratani et al. | 428/694 T |
| 6,468,670 B1 * | 10/2002 | Ikeda et al. | 428/611 |

* cited by examiner

Primary Examiner—Holly Rickman
(74) Attorney, Agent, or Firm—McDermott, Will & Emery

(57) ABSTRACT

A magnetic recording medium having increased thermal stability and signal-to-medium noise ratio (SMNR), comprising a layer stack including, in sequence:

(a) a continuous ferromagnetic layer;
(b) a non-magnetic spacer layer; and
(c) a discontinuous ferromagnetic layer;

wherein the continuous ferromagnetic layer (a) and the discontinuous ferromagnetic layer (c) are ferromagnetically or anti-ferromagnetically coupled together across the non-magnetic spacer layer.

18 Claims, 4 Drawing Sheets

STABILIZED RECORDING MEDIA INCLUDING COUPLED DISCONTINUOUS AND CONTINUOUS MAGNETIC LAYERS

CROSS-REFERENCE TO PROVISIONAL APPLICATIONS

This application claims priority from U.S. provisional patent applications Ser. Nos. 60/239,304 filed Oct. 10, 2000 and 60/239,477 filed Oct. 10, 2000, the entire disclosures of which are incorporated herein by reference.

FIELD OF THE INVENTION

The present invention relates to high areal recording density magnetic recording media exhibiting enhanced thermal stability and increased signal-to-medium noise ratio ("SMNR"). The invention finds particular utility in the form of hard disks such as employed in high areal recording density magnetic data/information storage and retrieval devices and systems.

BACKGROUND OF THE INVENTION

Magnetic recording ("MR") media and devices incorporating same are widely employed in various applications, particularly in the computer industry for data/information storage and retrieval applications, typically in disk form. Conventional magnetic thin-film media, wherein a fine-grained polycrystalline magnetic alloy layer serves as the active recording medium layer, are generally classified as "longitudinal" or "perpendicular", depending upon the orientation of the magnetic domains of the grains-of magnetic material.

A conventional longitudinal recording, hard disk-type magnetic recording medium 1 commonly employed in computer-related applications is schematically illustrated in FIG. 1, and comprises a substantially rigid, non-magnetic metal substrate 10, typically of aluminum (Al) or an aluminun-based alloy, such as an aluminum-magnesium (Al—Mg) alloy, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) or chromium-titanium (Cr—Ti) alloy; a polycrystalline underlayer 12B, typically of Cr or a Cr-based alloy, a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 10–14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic. field. The magnetization of the recording medium layer 13 can subsequently produce an electrical response in a read transducer, or read "head", allowing the stored information to be read.

Efforts are continually being made with the aim of increasing the areal recording density, i.e., the bit density, or bits/unit area, and signal-to-medium noise ratio ("SMNR") of the magnetic media. For example, the SMNR may be increased by reducing the grain size of the recording media, as by utilization of appropriately selected seed and underlayer structures and materials, and by reduction of the thickness of the magnetic recording layer. However, severe difficulties are encountered when the bit density of longitudinal media is increased above about 20–50 Gb/in$^2$ in order to form ultra-high recording density media, such as thermal instability, when the necessary reduction in grain size exceeds the superparamagnetic limit. Such thermal instability can, inter alia, reduce and cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, including that presented by the superparamagnetic limit, is to increase the crystalline anisotropy, thus the squareness of the magnetic bits, in order to compensate for the smaller grain sizes. However, this approach is limited by the field provided by the writing head.

Another proposed solution to the problem of thermal instability of very fine-grained magnetic recording media is to provide stabilization via coupling of the ferromagnetic recording layer with another ferromagnetic layer or an anti-ferromagnetic layer. In this regard, it has been recently proposed (E. N. Abarra et al., IEEE Conference on Magnetics, Toronto, April 2000) to provide a stabilized magnetic recording medium comprised of at least a pair of ferromagnetic layers which are anti-ferromagnetically-coupled ("AFC") by means of an interposed thin, non-magnetic spacer layer. The coupling is presumed to increase the effective volume of each of the magnetic grains, thereby increasing their stability; the coupling strength between the ferromagnetic layer pairs being a key parameter in determining the increase in stability.

However, a significant drawback associated with the above approach is the discontinuous character of each of the AFC-coupled ferromagnetic layers of the media Specifically, if the magnetic grains of the upper and lower magnetic layers are not grown in vertical alignment, or if they are not of equal size, the areas written in each of the pair of ferromagnetic layers may not coincide. In addition, the prior art approaches to media design fail to adequately take into account the significant effect on stability of magnetic recording media arising from interactions between magnetic grains.

Accordingly, there exists a need for improved methodology and structures for providing thermally stable, high areal recording density magnetic recording media, e.g., in the form of hard disks, with increased signal-to-media noise ratios (SMNRs), e.g., longitudinal media which methodology and media structures can be implemented/fabricated at a manufacturing cost compatible with that of conventional manufacturing technologies for forming high areal recording density magnetic recording media.

The present invention, therefore, addresses and solves problems attendant upon forming high areal recording density magnetic recording media, e.g., in the form of hard disks, which media utilize magnetic or anti-ferromagnetic coupling between spaced-apart pairs of ferromagnetic layers for enhancing thermal stability and increasing SMNR, while providing full compatibility with all aspects of conventional automated manufacturing technology. Moreover, manufacture and implementation of the present invention can be obtained at a cost comparable to that of existing technology.

DISCLOSURE OF THE INVENTION

An advantage of the present invention is an improved, high areal recording density magnetic recording medium having enhanced thermal stability.

Another advantage of the present invention is an improved, high areal recording density magnetic recording medium exhibiting an increase signal-to-medium noise ratio ("SMNR").

Yet another advantage of the present invention is an improved, high areal recording density magnetic recording medium having enhanced thermal stability and SMNR arising from magnetic or anti-ferromagnetic coupling between spaced-apart continuous and discontinuous ferromagnetic layers.

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by a magnetic recording medium having increased thermal stability and signal-to-medium noise ratio (SMNR), comprising a layer stack including, in sequence:

(a) a continuous ferromagnetic layer;

(b) a non-magnetic spacer layer; and (c) a discontinuous ferromagnetic layer;

wherein the continuous ferromagnetic layer (a) and the discontinuous ferromagnetic layer (c) are coupled together across the non-magnetic spacer layer.

According to embodiments of the present invention, the continuous ferromagnetic layer (a) comprises a material with a very low amount, e.g., <3–5 at. %, of non-magnetic phases, to ensure strong magnetic coupling between adjacent grains, and wherein, if the continuous layer has magnetic domains which are much larger than the average grain size in the discontinuous layer, the magnetocrystalline anisotropy is greater than about $10^7$ erg/cm$^3$ for reducing the width of the magnetic domain walls thereof to less than or similar to the width of the grains of the discontinuous layer, i.e., <100 Å, or, if the continuous layer is comprised of strongly coupled single domain grains, the magnetocrystalline anisotropy thereof is greater than about $10^6$ erg/cm$^3$; the continuous ferromagnetic layer (a) having a lower coercivity than that of the discontinuous magnetic layer (c), being from about 10 to about 200 Å thick and comprising an alloy material selected from the group consisting of Co$_3$Pt, MnAl, Nd$_2$Fe$_{14}$B, SmCo$_5$, Sm$_2$Co$_{17}$, Sm$_2$Fe$_{17}$(N,C), Co$_{100-x-y-z}$Cr$_x$Pt$_y$B$_z$, Co$_{100-x-y-z-w}$Cr$_x$Pt$_y$Nb$_z$Ta$_w$, and (Pt,Pd)(Co,Fe)L1$_0$ phase; and the non-magnetic spacer layer (b) is up to about 30 Å thick.

In accordance with embodiments of the present invention, the non-magnetic spacer layer (b) is from about 2 to about 30 Å thick and, depending upon its thickness, provides ferromagnetic or anti-ferromagnetic coupling ("AFC") between the continuous ferromagnetic layer (a) and the discontinuous ferromagnetic layer and comprises a material selected from the group consisting of ruthenium (Ru), rhodium (Rh), iridium (Ir), chromium (Cr), copper (Cu), and their alloys.

According to embodiments of the present invention, the discontinuous ferromagnetic layer (c) is from about 10 to about 300 Å thick, also has a large magnetocrystalline anisotropy, i.e., >10$^6$ erg/cm$^2$, for obtaining sufficient coercivity at lower saturation magnetization, includes exchange de-coupled or partially coupled magnetic grains, and comprises an alloy material selected from the group consisting of CoCr; CoCr with one or more added elements selected from Pt, Ta, B, Mo, Ru, Si, Ge, and Nb; Fe; and Ni.

In accordance with embodiments of the present invention, the magnetic recording medium further comprises:

(d) a substrate having at least one surface for supporting the layer stack; and (e) non-magnetic seed and underlayers intermediate the at least one surface of the substrate (d) and the layer stack for controlling the crystallographic texture of at least one of said ferromagnetic layers of the layer stack;

wherein the substrate (d) comprises a non-magnetic material selected from the group consisting of Al, Al-based alloys, NiP-plated Al, other non-magnetic metals, other non-magnetic metal alloys, glass, ceramics, glass-ceramics, polymers, and laminates and composites thereof; and the non-magnetic seed and underlayers (e) comprise materials selected from the group consisting of Ni—Al, Ni—Al—Ru, Ni—Al—Ti, Fe—Al, Ru—Al, CoTi, Ta, Ta—N, Cr, Cr—Ta, Cr—W, Cr—Mo, Cr—V, Cr—Ti, Cr—Ru, and Cr—Ru—Ta.

According to a particular embodiment of the present invention, the discontinuous ferromagnetic layer (c) of the layer stack is proximate the at least one surface of the substrate (d); and the medium may further comprise a stacked layer pair intermediate the discontinuous ferromagnetic layer (c) of the layer stack and the non-magnetic seed and underlayers (e), the stacked layer pair consisting of a continuous ferromagnetic layer (a) or a discontinuous ferromagnetic layer (c) adjacent the non-magnetic seed and underlayers (e) and a non-magnetic spacer layer (b) adjacent the discontinuous ferromagnetic layer (c) of the layer stack.

In accordance with another particular embodiment of the present invention, the continuous ferromagnetic layer (a) of the layer stack is proximate the at least one surface of the substrate (d); and the medium may further comprise a stacked layer pair intermediate the continuous ferromagnetic layer (a) of the layer stack and the non-magnetic seed and underlayers (e), the stacked layer pair consisting of a continuous ferromagnetic layer (a) or a discontinuous ferromagnetic layer (c) adjacent the non-magnetic seed and underlayers (e) and a non-magnetic spacer layer (b) adjacent the continuous ferromagnetic layer (a) of the layer stack.

Embodiments of the magnetic media provided by the present invention may further comprise:

(f) a protective overcoat layer over the layer stack; and (g) a lubricant topcoat over the protective overcoat layer.

According to another aspect of the present invention, a magnetic recording medium exhibiting enhanced thermal stability and increased signal-to-medium noise ratio (SMNR) comprises:

(a) a layer stack including, in sequence:

(i) a continuous ferromagnetic layer;

(ii) a non-magnetic spacer layer; and a (iii) a discontinuous ferromagnetic layer;

wherein the continuous ferromagnetic layer (i) and the discontinuous ferromagnetic layer (iii) each comprises a material having a very high magnetocrystalline anisotropy greater than about $10^6$ erg/cm$^3$ for obtaining sufficient coercivity at lower saturation magnetization and minimizing the width of the magnetic domain walls, respectively, the continuous ferromagnetic layer (i) has a lower coercivity than that of the discontinuous ferromagnetic layer (iii), the non-magnetic spacer layer provides magnetic or anti-ferromagnetic coupling between the continuous ferromagnetic layer (i) and the discontinuous ferromagnetic layer (iii) depending upon its thickness, and the discontinuous ferromagnetic layer includes exchange de-coupled or partially coupled magnetic grains;

(b) a substrate having at least one surface for supporting the layer stack; and (c) non-magnetic seed and underlayers intermediate the at least one surface of the substrate (b) and the layer stack (a) for controlling the crystallographic texture of at least one of the ferromagnetic layers of the layer stack.

According to embodiments of the present invention, either the continuous ferromagnetic layer (i) or the discontinuous ferromagnetic layer (iii) of the layer stack (a) is proximate the at least one surface of the substrate (b), and the medium may further comprise a stacked layer pair intermediate the layer stack (a) and the non-magnetic seed and underlayers (c), the stacked layer pair consisting of a continuous ferromagnetic layer (i) or a discontinuous ferromagnetic layer (iii) adjacent the non-magnetic seed and underlayers (c) and a non-magnetic spacer layer (ii) adjacent the layer stack (a).

In accordance with further embodiments of the present invention, the magnetic recording medium further comprises:

(d) a protective overcoat layer over the layer stack (a); and (e) a lubricant topcoat over the protective overcoat layer.

Still another aspect of the present invention is an improved magnetic recording medium, comprising:

(a) a layer stack comprising at least a pair of spaced-apart continuous and discontinuous ferromagnetic layers; and (b) means for enhancing the thermal stability and signal-to-medium noise ratio (SMNR) of the medium.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon recognition that high areal recording density magnetic recording media, e.g., longitudinal recording media, having improved thermal stability and increased signal-to-medium noise ratio (SMNR), can be reliably and controllably provided by a layer stack comprising a pair of vertically spaced-apart ferromagnetic layers which are magnetically coupled together across a non-magnetic spacer layer, wherein one layer of the pair of ferromagnetic layers is continuous and the other layer of the pair is discontinuous, and the non-magnetic spacer layer provides ferromagnetic or anti-ferromagnetic (AFC) coupling between the pair of layers. Moreover, the layer stack may be oriented with respect to a substrate surface such that either type of ferromagnetic layer (i.e., continuous or discontinuous) is proximate the substrate surface, with the other type of ferromagnetic layer (i.e., discontinuous or continuous) forming the upper (or top) layer of the medium. According to the invention, wherein coupling is provided between continuous and discontinuous (recording) ferromagnetic layers, the size of the bits in the continuous layer will follow the size of the written bits in the discontinuous layer. Moreover, the volume of the grains effectively increases with increase in magnetic interaction between grains in the ferromagnetic layers. Thus, the stability of the discontinuous ferromagnetic layer improves when coupled with a continuous ferromagnetic layer, as compared to when two discontinuous layers are coupled together, as for example, shown in FIG. 9, described in more detail infra.

The inventive methodology affords several advantages not obtainable according to the conventional art, including, inter alia, enhanced magnetic coupling between vertically spaced-apart continuous and discontinuous ferromagnetic layers, leading to improved thermal stability and increased SMNR, and reliable, controllable, and cost-effective formation of very high areal recording density magnetic recording media utilizing conventional manufacturing techniques and instrumentalities, e.g., sputtering techniques and apparatus.

Figure 1:
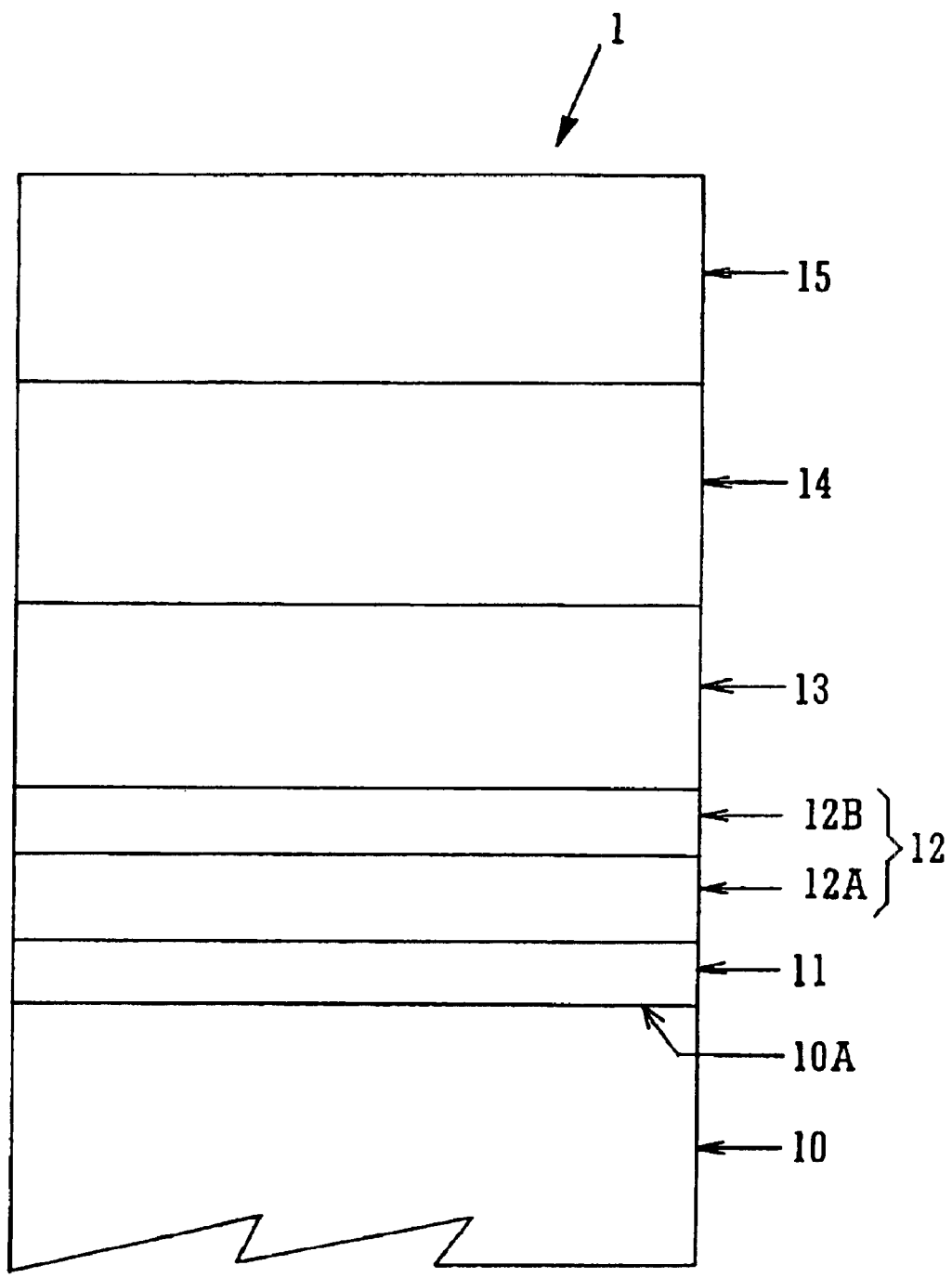
FIG. 1 schematically illustrates, in simplified cross-sectional view, a portion of a conventional longitudinal-type magnetic disk recording medium.
Figure 2:
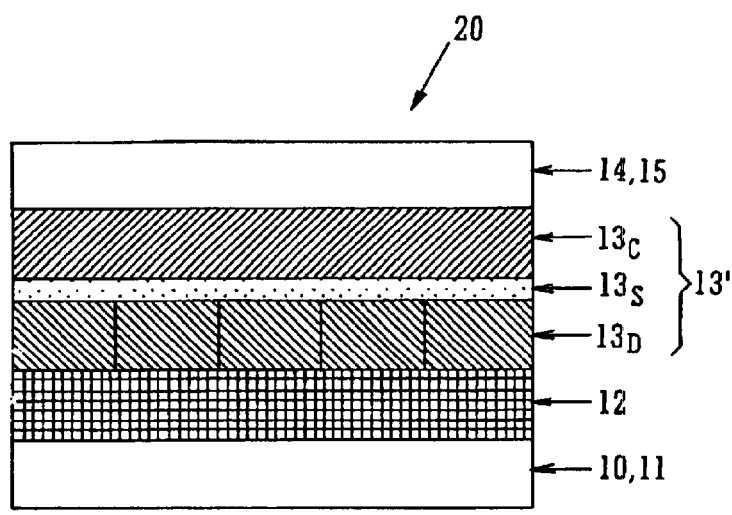
FIGS. 2–4, respectively, schematically illustrate, in simplified cross-sectional view, portions of first, second, and third embodiments of improved magnetic recording media according to the present invention.

Referring now to FIG. 2, schematically shown therein, in simplified cross-sectional view, is a portion of a first embodiment of a thin film magnetic recording medium 20 fabricated according to the principle of the present invention. As illustrated, medium 20 includes a non-magnetic substrate 10 comprised of a material selected from among Al, Al-based alloys (e.g., Al—Mg), NiP-plated Al, other non-magnetic metals or alloys, glass, ceramics, glass-ceramics, polymers, and laminates and composites thereof. The thickness of substrate 10 is not critical; however, in the case of magnetic recording media intended for use in hard disk applications, substrate 10 must be of a thickness sufficient to provide the necessary rigidity. A plurality of overlying thin film layers are formed as to overlie at least one surface of substrate 10, e.g., the upper surface, which plurality of layers include, in sequence from the substrate upper surface, a plating layer 11, e.g., a layer of amorphous NiP from about 100 Å to about 15 µm thick (when substrate 10 is Al-based); an underlayer layer 12 for controlling the crystallographic texture and properties of ferromagnetic Co-based alloy layers deposited thereover, which underlayer 12 includes first, or lower, and second, or upper, portions 12A and 12B, respectively (see FIG. 1), wherein the first, or lower portion 12A is a seed layer comprised of an amorphous or fine-grained material, e.g., a Ni—Al, Ni—Al—Ru, Ni—Al—Ti, Fe—Al, Ru—Al, Co—Ti, Cr—Ti, Ta, or Ta—N layer from about 10 to about 1000 Å thick, and the second, or upper portion 12B is a polycrystalline underlayer, typically a layer of Cr, a layer of a Cr-based alloy such as Cr—W, Cr—Mo, Cr—V, Cr—Ti, Cr—Ru, and Cr—Ru—Ta, or a Ru—Al or Co—Ti layer from about 10 to about 300 Å thick; a sandwich-type layer structure 13' replacing the single ferromagnetic layer 13 of the conventionally-structured magnetic recording medium 1 of FIG. 1, which sandwich-type layer stack structure 13' is comprised of a discontinuous, lower ferromagnetic layer $13_D$ proximate the substrate upper surface, a non-magnetic spacer layer $13_S$, and a continuous, upper ferromagnetic layer $13_C$; a protective overcoat layer 14, typically containing carbon (C), e.g., a diamond-like carbon ("DLC"); and a lubricant topcoat layer 15, e.g., of a perfluoropolyether, the latter two layers each being of a conventional thickness, i.e., <100 Å. Each of layers 11–14, including each of layers $13_D$, $13_S$, and $13_C$ constituting layer stack 13', may be deposited by suitable/conventional physical vapor deposition ("PVD") techniques, such as sputtering, and layer 15 may be deposited by dipping or spraying.

According to the invention, the discontinuous, lower ferromagnetic layer $13_D$: (1) is thin (e.g., from about 10 to about 300 Å thick); (2) includes exchange de-coupled or partially coupled magnetic grains; (3) has a large magnetocrystalline anisotropy greater than about $10^6$ erg/cm$^3$; and (4) comprises an alloy selected from the group consisting of CoCr; CoCr with one or more added elements selected from Pt, Ta, B, Mo, Ru, Si, Ge, and Nb; Fe; and Ni.

Similarly, according to the invention, the continuous, lower ferromagnetic layer $13_C$: (1) comprises a material having a very low amount of non-magnetic phases, i.e., <3–5 at. %, for ensuring strong magnetic coupling between adjacent grains; (2A) in the case where the continuous layer is comprised of magnetic domains which are much larger than the average grain size in the discontinuous layer, comprises a material having a very high magnetocrystalline anisotropy greater than about $10^7$ erg/cm$^3$ for reducing the width of the magnetic domain walls thereof to less than or similar to the width of the grains of the discontinuous layer, i.e., <100 Å; or (2B) in the case where the continuous layer is comprised of strongly magnetically coupled single domain grains, comprises a material having a magnetocrystalline anisotropy greater than about $10^6$ ergs/cm$^3$; (3) a lower coercivity than that of the discontinuous ferromagnetic layer $13_D$; (4) a thickness of from about 10 to about 200 Å; and (5) comprises an alloy material selected from the group consisting of $Co_3Pt$, MnAl, $Nd_2Fe_{14}B$, $SmCo_5$, $Sm_2Co_{17}$, $Sm_2Fe_{17}(N,C)$, $Co_{100-x-y-z}Cr_xPt_yB_z$, $Co_{100-x-y-z-w}Cr_xPt_yNb_zTa_w$, and $(Pt,Pd)(Co,Fe)L1_0$ phase.

According to the invention, the non-magnetic spacer layer $13_S$ is: (1) up to about 30 Å thick; (2) depending upon its thickness, provides ferromagnetic to anti-ferromagnetic (AFC) coupling between the discontinuous, lower ferromagnetic layer $13_D$ and the continuous, upper ferromagnetic layer $13_C$; and (3) comprises a material selected from the group consisting of Ru, Rh, Ir, Cr, Cu, and their alloys. The coupling between the top and bottom ferromagnetic layers across the non-magnetic spacer layer is oscillatory, with a period of oscillation that depends upon the spacer layer. The coupling strength falls off in inverse relation to the square of the (increase in) spacer layer thickness, i.e., $\sim 1/d^2$. Thus, only the first two peaks, the first corresponding to anti-ferromagnetic (AFC) coupling and the second corresponding to ferromagnetic coupling, are of practical interest in this type of oscillatory coupling. For example, Ru spacer layer thicknesses between about 4 and about 10 Å provide anti-ferromagnetic coupling between layers $13_C$ and $13_D$, whereas Ru spacer layer thicknesses between about 12 and about 16 Å provide ferromagnetic coupling between layers $13_C$ and $13_D$.

A significant benefit provided by the presence of the continuous ferromagnetic layer $13_C$ in AFC media is increased stability. In addition, the bits in the continuous ferromagnetic layer $13_C$ are expected to replicate the bits in the discontinuous ferromagnetic layer $13_D$. This situation can be obtained even in cases where the grains in the continuous and discontinuous layers do not grow exactly one above the other. If the magnetocrystalline anisotropy of the continuous ferromagnetic layer $13_C$ is greater than about $10^7$ erg/cm$^3$ and the magnetic domains thereof are much larger than the average grain size in the discontinuous ferromagnetic layer $13_D$, the width of the magnetic domain walls is very thin, i.e., <~100 Å. In this event, the transition width between bits in the continuous ferromagnetic layer $13_C$ is expected to be smaller than that of the transition region between bits in the discontinuous ferromagnetic layer $13_D$.

Placement of continuous ferromagnetic layer $13_C$ above discontinuous ferromagnetic layer $13_D$ via the intervening non-magnetic spacer layer $13_S$ for providing ferromagnetic or anti-ferromagnetic (AFC) coupling therebetween provides a number of benefits, including increases in both thermal stability and signal-to-media noise ratio (SMNR). If the coupling is ferromagnetic, the magnetization of the continuous, upper ferromagnetic layer $13_C$ is adjusted so as to provide the desired or required increase in magnetic signal. However, if the coupling is anti-ferromagnetic, the magnetization, hence magnetic signal, of the continuous, upper ferromagnetic layer $13_C$ is preferably larger than that of the discontinuous, lower (recording) ferromagnetic layer $13_D$.

While not desirous of being bound by any particular theory, it is nonetheless believed that, according to the present invention, wherein coupling (ferromagnetic or anti-ferromagnetic) between the discontinuous, lower (recording) ferromagnetic layer $13_D$ and the continuous, upper ferromagnetic layer $13_C$ is preferable to coupling between two discontinuous ferromagnetic layers in that the sizes of the bits in the continuous, upper ferromagnetic layer $13_C$ will replicate the sizes of the written bits in the discontinuous, lower (recording) ferromagnetic layer $13_D$. Moreover, the volume of the grains effectively increases with increased magnetic interaction between the grains in the ferromagnetic layers. Thus, the stability of the discontinuous ferromagnetic layer $13_D$ will improve if it is coupled with a continuous ferromagnetic layer $13_C$, as compared to the situation when it is coupled with another discontinuous layer (see, e.g., FIG. 9, described below). Finally, if the magnetic domains in the continuous ferromagnetic layer $13_C$ are much larger than the average grain size in the discontinuous ferromagnetic layer $13_D$, the magnetocrystalline anisotropy of the continuous ferromagnetic layer $13_C$ must be greater than about $10^7$ erg/cm$^3$ so that the width of the domain walls is less than or similar to the width of the transition between recorded bits in conventional media, i.e. <~100 Å.

Figure 3:
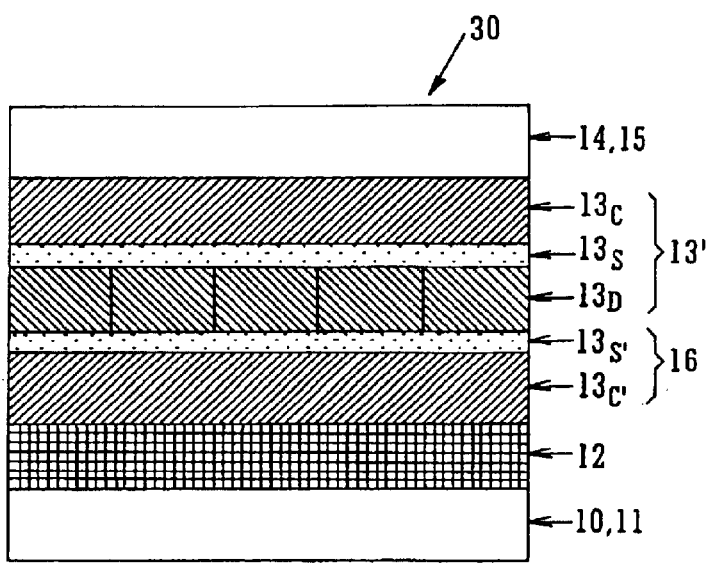
Figure 4:
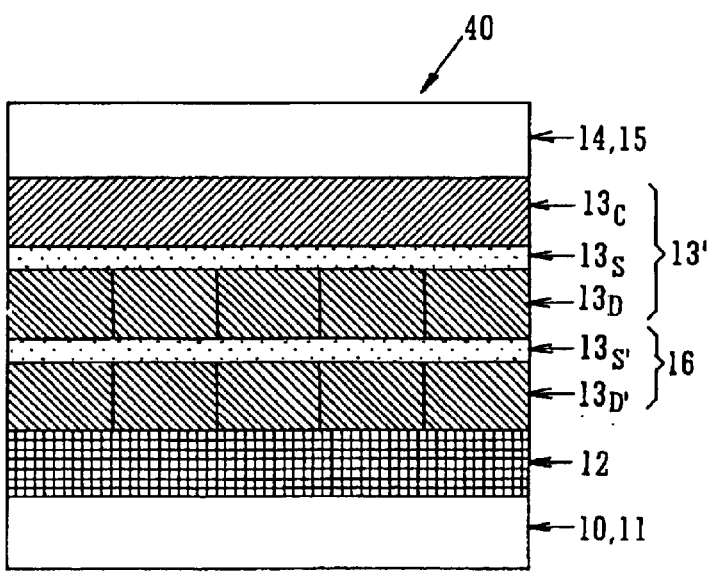

Referring now to FIGS. 3–4, schematically shown therein, in simplified cross-sectional view, are portions of second and third embodiments 30 and 40, respectively, according to the present invention, representing modifications of the first embodiment shown in FIG. 2 to include a stacked layer pair 16 intermediate the second, or polycrystalline underlayer portion 12B of underlayer layer 12 and the discontinuous, lower (recording) ferromagnetic layer $13_D$. According to the second embodiment 30, shown in FIG. 3, layer pair 16 consists of a lower, continuous ferromagnetic layer $13_{C'}$ adjacent underlayer portion 12B, which layer $13_{C'}$ is substantially similar in essential respects to the above-described continuous, upper ferromagnetic layer $13_C$, and an upper, non-magnetic spacer layer $13_{S'}$ which is substantially similar in essential respects to the above-described spacer layer $13_S$. The third embodiment 40, shown in FIG. 4, is similar to the second embodiment 30 of FIG. 3; however, the lower, continuous ferromagnetic layer $13_{C'}$ is replaced by a discontinuous ferromagnetic layer $13_{D'}$ substantially similar in essential respects to the above-described discontinuous, lower ferromagnetic layer $13_D$.

Figure 5:
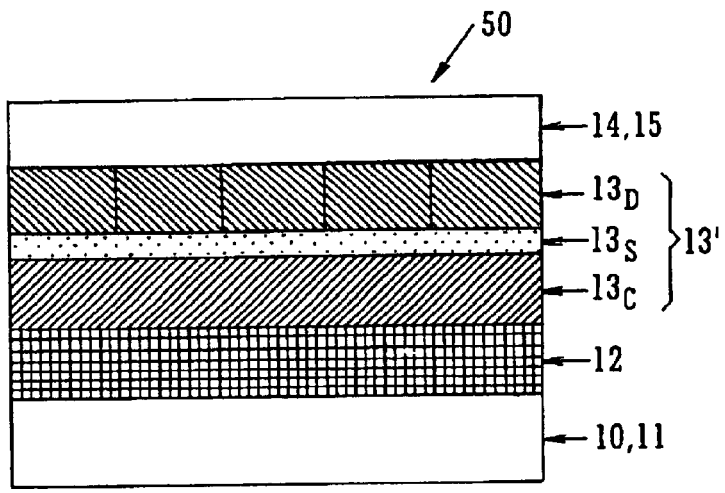
FIGS. 5–7, respectively, schematically illustrate, in simplified cross-sectional view, portions of fourth, fifth, and sixth embodiments of improved magnetic recording media according to the present invention.
Figure 6:
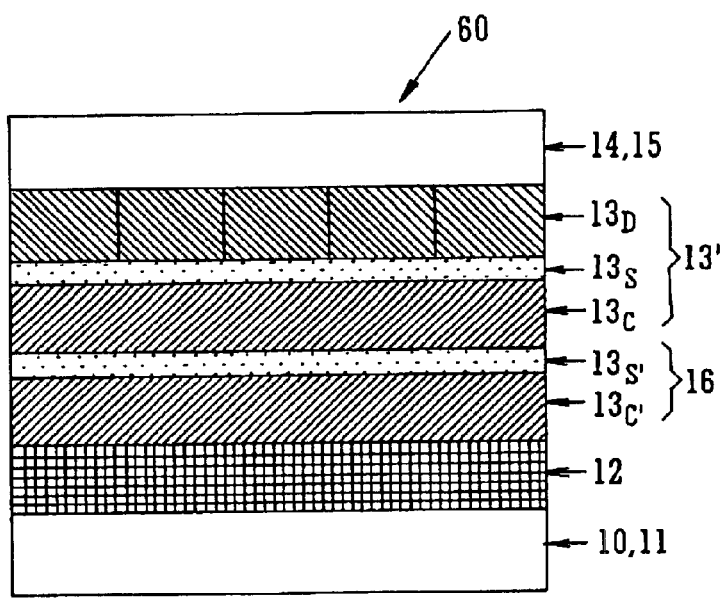
Figure 7:
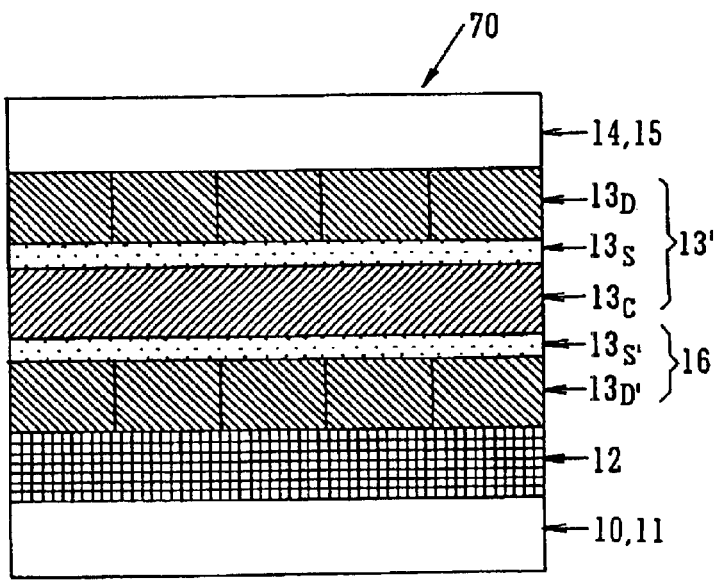

Referring now to FIGS. 5–7, schematically illustrated therein, in simplified cross-sectional view, are fourth, fifth, and sixth embodiments 50, 60, and 70, respectively, of the present invention, which embodiments utilize the same or very similar layers, materials, etc., and respectively correspond to the first, second, and third embodiments described above in detail with reference to FIGS. 2–4, and thus will not be described here in detail, except for the essential difference therebetween. As may be evident from the drawing figures, the fourth, fifth, and sixth embodiments 50, 60, and 70 of the invention differ in essential respect from the respectively corresponding first, second, and third embodiments 20, 30, and 40 only in the relative positioning of the discontinuous ferromagnetic layer $13_D$ and the continuous ferromagnetic layer $13_C$ of layer stack 13'. Specifically, according to the fourth, fifth, and sixth embodiments 50, 60, and 70 shown in FIGS. 5–7, respectively, the continuous ferromagnetic layer $13_C$ forms the lower, rather than upper, layer of layer stack 13', and the discontinuous (recording) ferromagnetic layer $13_D$ forms the upper, rather than lower, layer of layer stack 13'.

The fourth, fifth, and sixth embodiments 50, 60, and 70 afford the same, or at least comparable, advantages and features as provided by the first, second, and third embodiments 20, 30, and 40, i.e., improved thermal stability and SMNR, replication of the written bit sizes of the discontinuous (recording) ferromagnetic layer $13_D$ in the magnetic domain sizes of the continuous ferromagnetic layer $13_C$, and a much larger effective volume of the grains of the discontinuous ferromagnetic layer $13_D$ than obtainable when two discontinuous ferromagnetic layers are coupled together.

EXAMPLE

Figure 8:
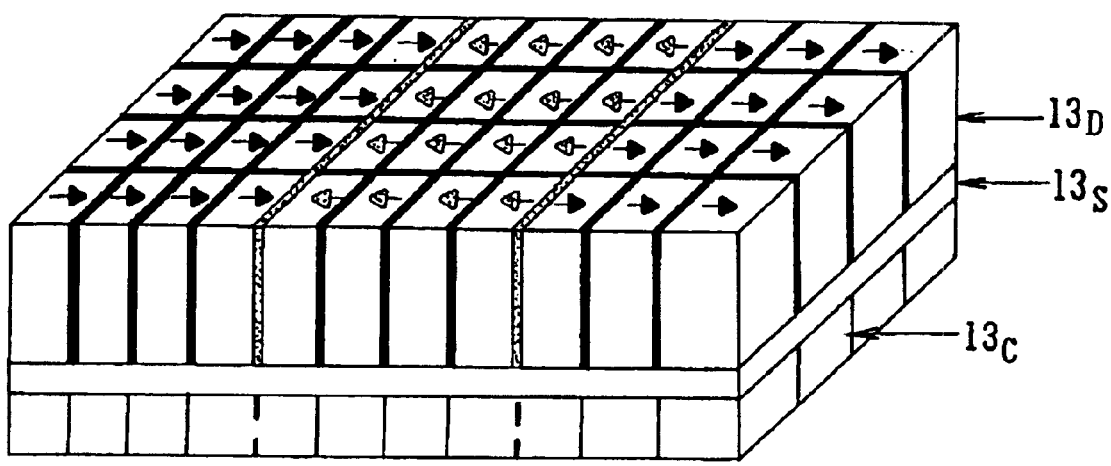
FIG. 8 schematically illustrates, in simplified perspective view, a portion of a thin film magnetic medium fabricated according to the principles of the invention, for demonstrating the importance of interaction of magnetic grains on stability of anti-ferromagnetically coupled (AFC) media.

A series of AFC media were fabricated having the structure schematically illustrated in simplified perspective view in FIG. 8, each medium comprising, in overlying sequence: a lower ferromagnetic layer $13_C$ composed of a ferromagnetic alloy having a composition $Co_{100-x-y-z}Cr_xPt_yB_z$ (where x=8, 12, or 16 and y and z are constant); a non-magnetic spacer layer $13_S$ of Ru for providing AFC; and an upper, discontinuous ferromagnetic layer $13_D$ composed of a CoCrPtB alloy with fully de-coupled magnetic grains. $Co_{100-x-y-z}Cr_xPt_yB_z$ ferromagnetic layers $13_C$ where x=8, 12, or 16 have similar magnetocrystalline anisotropy and magnetization but different amounts of non-magnetic phases. In this way, the interaction between the magnetic grains in the ferromagnetic layer $13_C$ was progressively decreased from strong in $Co_{100-x-y-z}Cr_xPt_yB_z$ with x=8 to weak in $Co_{100-x-y-z}Cr_xPt_yB_z$ with x=16 in order to investigate the effect of interaction of the magnetic ;grains of the lower ferromagnetic layer $13_C$ on stability of the AFC media.

Figure 9:
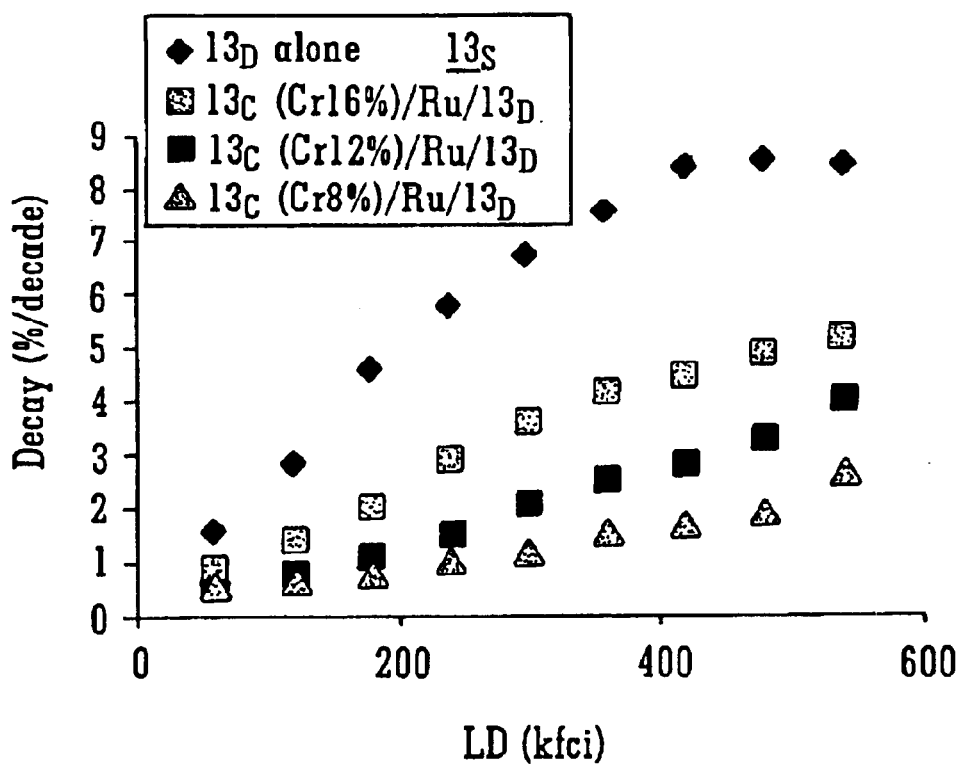
FIG. 9 is a graph for showing the effect of increased interaction between magnetic grains in the bottom layer of the medium of FIG. 8 on signal stability.

Results of the above-described investigation are graphically presented in FIG. 9, wherein it is clearly evident that the stability of AFC media (measured in %/decade as a function of linear density kfci) increases with increased interaction between the magnetic grains in the lower, continuous ferromagnetic layer $13_C$, i.e., stability progressively increases with progressive decrease in the amount of non-magnetic phases of the lower, continuous ferromagnetic layer $13_C$ as the Cr content x thereof decreases from 16 to 12 to 8. Thus, the SNR of the AFC media was not compromised by the increased interaction (i.e., coupling) between the magnetic grains in the lower, continuous ferromagnetic layer $13_C$.

The present invention thus advantageously provides high quality, thermally stable, high areal recording density magnetic recording media, which media achieve provide improved thermal stability and signal-to-medium noise ratio (SMNR) via enhanced magnetic or anti-ferromagnetic coupling of a discontinuous ferromagnetic recording layer with another, continuous is ferromagnetic through a non-magnetic spacer layer. Moreover, the inventive methodology can be practiced in a cost-effective manner utilizing conventional manufacturing technology and equipment (e.g., sputtering technology/equipment) for automated, large-scale manufacture of magnetic recording media, such as hard disks. Finally, the invention is not limited to use with hard disks but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practice without resorting to the details specifically set forth herein. In other instances, well-known processing techniques and structures have not been described in order not to unnecessarily obscure the present invention.

Only the preferred embodiments of the present invention and but a few example of its versatility are shown and described in the present disclosure. It is to be understood that the present invention is capable of use in various other combinations and environments and is susceptible of changes and/or modifications within the scope of the inventive concept as expressed herein.

What is claimed is:

1. A magnetic recorder medium comprising a layer stack including, in sequence:

(a) a continuous ferromagnetic layer;
   (b) a non-magnetic spacer layer; and
   (c) a discontinuous ferromagnetic layer;
   wherein:
   said continuous ferromagnetic layer (a) and said discontinuous ferromagnetic layer (c) are coupled together across said non-magnetic spacer layer; and said discontinuous ferromagnetic layer (c) is from about 10 to about 300 Å thick, has a large magnetocrystalline anisotropy greater than about $10^6$ erg/cm$^3$ for obtaining sufficient coercivity at lower saturation magnetization thereof, and includes exchange de-coupled or partially coupled magnetic grains.

2. The magnetic recording medium as in claim 1, wherein:

said continuous ferromagnetic layer (a) comprises a material having less than about 5 at. % of non-magnetic phases for ensuring strong magnetic coupling between adjacent grains, a very high magnetocrystalline anisotropy greater than about $10^7$ erg/cm$^3$ for reducing the width of the magnetic domain walls thereof to less than or equal to the average size of the grains of said discontinuous ferromagnetic layer when the magnetic domains of the continuous ferromagnetic layer are larger than the average grain size in said discontinuous layer, or a high magnetocrystalline anisotropy greater than about $10^6$ erg/cm$^3$ when comprised of coupled single domain grains, and a lower coercivity than that of said discontinuous ferromagnetic layer (c).

3. The magnetic recording medium as in claim 2, wherein:

said continuous ferromagnetic layer (a) is from about 10 to about 200 Å thick and comprises an alloy material selected from the group consisting of Co$_3$Pt, MnAl, Nd$_2$Fe$_{14}$B, SmCo$_5$, Sm2Co$_{17}$, Sm$_2$Fe$_{17}$(N,C), Co$_{100-x-y-z}$Cr$_x$Pt$_y$B$_z$, Co$_{100-x-y-z-w}$Cr$_x$Pt$_y$Nb$_z$Ta$_w$, and (Pt, Pd)Co., Fe)L1$_0$ phase.

4. The magnetic recording medium as in claim 1, wherein: said non-magnetic spacer layer (b) is from about 2 to about 30 Å thick.

5. The magnetic recording medium as in claim 4, wherein:

said non-magnetic spacer layer (b) provides magnetic or anti-ferromagnetic coupling between said continuous ferromagnetic layer (a) and said discontinuous ferromagnetic layer, depending upon the thickness thereof, and comprises a material selected from the group of Ru, Rh, Ir, Cr, Cu, and their alloys.

6. The magnetic recording medium as in claim 1, formed as a longitudinal recording medium.

7. The magnetic recording medium as in claim 1, wherein:

said discontinuous ferromagnetic layer (c) comprises an alloy material selected from the group consisting of CoCr; CoCr with one or more added elements selected from Pt, Ta, B, Mo, Ru, Si, Ge, and Nb; Fe; and Ni.

8. The magnetic recording medium as in claim 1, further comprising:

(d) a substrate having at least one surface for supporting a said layer stack; and (e) non-magnetic seed and underlayers intermediate said at least one surface of said substrate (d) and said layer stack for controlling the crystallographic texture of at least one of said ferromagnetic layers of said layer stack.

9. The magnetic recording medium as in claim 8, wherein: said substrate (d) comprises a non-magnetic material selected from the group consisting of Al, Al-based alloys, NiP-plated Al, other non-magnetic metals, other non-magnetic metal alloys, glass, ceramics, glass-ceramics, polymers, and laminates and composites thereof; and said non-magnetic seed and underlayers (e) comprises materials selected from the group consisting of Ni—Al, Ni—Al—Ru, Ni—Al—Ti, Fe—Al, Ru—Al, CoTi, Ta, Ta—N, Cr, Cr—Ta, Cr—W, Cr—Mo, Cr—V, Cr—Ti, Cr—Ru, and Cr—Ru—Ta.

10. The magnetic recording medium as in claim 8, wherein:

said discontinuous ferromagnetic layer (c) of said layer stack is proximate said at least one surface of said substrate (d).

11. The magnetic recording medium as in claim 10 further comprising a stacked layer pair intermediate said discontinuous ferromagnetic layer (c) of said layer stack and said non-magnetic seed and underlayers (e), said stacked layer pair consisting of a continuous ferromagnetic layer (a) or a discontinuous ferromagnetic layer (c) adjacent said non-magnetic seed and underlayers (e) and a non-magnetic spacer layer (b) adjacent said discontinuous ferromagnetic layer (c) of said layer stack.

12. The magnetic recording medium as in claim 8, wherein:

said continuous ferromagnetic layer (a) of said layer stack is proximate said at least one surface of said substrate (d).

13. The magnetic recording medium as in claim 12, further comprising a stacked layer pair intermediate said continuous ferromagnetic layer (a) of said layer stack and said non-magnetic seed and underlayers (e), said stacked layer pair consisting of a continuous ferromagnetic layer (a) or a discontinuous ferromagnetic layer (c) adjacent said non-magnetic seed and underlayers (e) and a non-magnetic spacer layer (b) adjacent said continuous ferromagnetic layer (a) of said layer stack.

14. The magnetic recording medium as in claim 8, further comprising:

(f) a protective overcoat layer over said stack; and (g) a lubricant topcoat over said protective overcoat layer.

15. A magnetic recording medium, comprising:

(a) a layer stack including, in sequence:
  (i) a continuous ferromagnetic layer;
  (ii) a non-magnetic spacer layer; and
  (iii) a discontinuous ferromagnetic layer;

wherein said continuous ferromagnetic layer (i) and the discontinuous ferromagnetic layer each comprises a material having a very high magnetocrystalline anisotropy greater than about $10^6$ erg/cm$^3$ for obtaining sufficient coercivity at lower saturation magnetization thereof and minimizing the width of the magnetic domain walls, respectively, the continuous ferromagnetic layer has a lower coercivity than that of said discontinuous ferromagnetic layer (iii), said non-magnetic spacer layer provides magnetic or anti-ferromagnetic coupling between said continuous ferromagnetic layer (i) and said discontinuous ferromagnetic layer (iii), depending upon its thickness; and said discontinuous ferromagnetic layer is from about 10 to about 300 Å thick, has a large magnetocrystalline anisotropy greater than about $10^6$ erg/cm$^3$ for obtaining sufficient coercivity at lower saturation magnetization thereof, and includes exchange de-coupled or partially magnetic grains.

16. The magnetic recording medium as in claim 15, wherein:

either said continuous ferromagnetic layer (i) or said discontinuous ferromagnetic layer (iii) of said layer stack (a) is proximate said at least one surface of said substrate (b).

17. The magnetic recording medium as in claim 16, further comprising a stacked layer pair intermediate said layer stack (a) and said non-magnetic seed and underlayers (c), said stacked layer pair consisting of a continuous ferromagnetic layer (i) or a discontinuous ferromagnetic layer (iii) adjacent said non-magnetic seed and underlayer (c) and a non-magnetic spacer layer (ii) adjacent said layer stack (a).

18. The magnetic recording medium as in claim 16, further comprising:

(d) a protective overcoat layer over said layer stack (a); and (e) a lubricant topcoat over said protective overcoat layer.

* * * * *